(12) United States Patent
Kim et al.

(10) Patent No.: US 8,375,504 B2
(45) Date of Patent: Feb. 19, 2013

(54) WIPER BLADE FOR VEHICLE

(75) Inventors: Ill Soo Kim, Suwon-si (KR); Chang Ky Kang, Hwaseong-si (KR); Chang Oan Woo, Hwaseong-si (KR); Jong Heon Lee, Hwaseong-si (KR); Jae Hyuck An, Daegu (KR)

(73) Assignees: Hyundai Motor Company, Seoul (KR); Kia Motors Corporation, Seoul (KR); KCW Corporation, Daegu (KR)

( * ) Notice: Subject to any disclaimer, the term of this patent is extended or adjusted under 35 U.S.C. 154(b) by 464 days.

(21) Appl. No.: 12/729,089

(22) Filed: Mar. 22, 2010

(65) Prior Publication Data

US 2011/0083295 A1    Apr. 14, 2011

(30) Foreign Application Priority Data

Oct. 13, 2009  (KR) .................. 10-2009-0097459

(51) Int. Cl.
*A47L 1/00* (2006.01)
*B60S 1/02* (2006.01)

(52) U.S. Cl. ........... 15/250.32; 15/250.201; 15/250.361; 15/250.46

(58) Field of Classification Search ............ 15/250.201, 15/250.31, 250.32, 250.33, 250.351, 250.361, 15/250.43, 250.44, 250.46
See application file for complete search history.

(56) References Cited

U.S. PATENT DOCUMENTS

| | | | |
|---|---|---|---|
| 4,583,259 A * | 4/1986 | Will | 15/250.452 |
| 5,235,721 A * | 8/1993 | Charng | 15/250.454 |
| 7,395,578 B2 * | 7/2008 | Huang | 15/250.32 |
| 2002/0133896 A1 | 9/2002 | Herinckx et al. | |
| 2008/0060161 A1 * | 3/2008 | Boland et al. | 15/250.351 |

FOREIGN PATENT DOCUMENTS

| | | |
|---|---|---|
| JP | 8-318824 A | 12/1996 |
| WO | WO 02/40328 A1 | 5/2002 |
| WO | WO 2006/106006 A1 | 10/2006 |

* cited by examiner

*Primary Examiner* — William Gilbert
(74) *Attorney, Agent, or Firm* — Morgan, Lewis & Bockius LLP

(57) ABSTRACT

A wiper blade for a vehicle may include a secondary lever including a lever rivet hole, an adapter including a guide rib formed in the longitudinal direction thereof, a locking projection formed at the rear thereof, and an adapter rivet hole, a primary cover including a guide groove formed in the longitudinal direction thereof and into which the guide rib of the adapter is inserted, and a locking groove into which the locking projection of the adapter is inserted, and a hinge member penetrating the lever rivet hole and the adapter rivet hole and pivotally coupling the adapter and secondary lever.

12 Claims, 12 Drawing Sheets

<A-A Cross section>

WIPER BLADE FOR VEHICLE

CROSS-REFERENCE TO RELATED APPLICATION

The present application claims priority to Korean Patent Application No. 10-2009-0097459 filed on Oct. 13, 2009, the entire contents of which are incorporated herein for all purposes by this reference.

BACKGROUND OF THE INVENTION

1. Field of the Invention

The present disclosure relates to a wiper blade for a vehicle which is used to remove water and other substances from the surface of a glass. More particularly, it relates to a wiper blade for a vehicle which improves the assemblability and hinge strength to prevent vibration during wiping of the glass surface, thereby improving the operational performance of the wiper blade.

2. Description of Related Art

In general, a wiper is mounted on the outside surface of a windshield glass or a rear window of a vehicle to remove rainwater or foreign substances from the glass surface during a rainy or snowy day, thus ensuring a driver's visibility. The driving force of a drive motor mounted on the vehicle is transmitted to a wiper arm through a link mechanism such that the wiper arm reciprocates at a predetermined angle.

A wiper blade is installed at the front end of the wiper arm such that a blade rubber attached to the wiper blade is moved left and right while being in contact with the glass surface to remove water or foreign substances.

That is, when the driver's visibility is poor due to fog, rain, snow or dust while driving the vehicle, the driver activates the wiper, and thereby the wiper arm is rotated by the operation of the motor such that the wiper blade installed at the front end of the wiper arm is moved to wipe the glass surface by virtue of the blade rubber attached to the wiper blade.

FIG. 1 is an exploded perspective view showing a wiper blade for a vehicle, FIG. 2 is a partial perspective view showing a primary cover and a secondary lever of a conventional wiper blade, FIG. 3 is a partial perspective view showing a hinge structure of a conventional wiper blade, and FIG. 4 is a cross-sectional view taken along line A-A of FIG. 3.

As shown in FIG. 1, the wiper blade may include a blade rubber 40 for wiping a windshield glass or rear window while being in contact with the glass surface, a primary cover 10 connected to a wiper arm 50, a secondary lever 20 provided on both sides of the primary cover 10, and a yoke 30 provided on one side of each secondary lever 20 and supporting the blade rubber 40.

The wiper blade with the above-described configuration wipes the curved surface of the glass by the operation of the wiper in a state that the angle formed by the yokes 30 supporting the blade rubber 40 and the secondary levers 20 is varied with respect to a hinge axis and thereby the blade rubber 40 is bent like a bow.

However, as shown in FIG. 2, the conventional wiper blade has the problems that the primary cover 10 may be damaged as the secondary lever 20 is forcibly inserted into a hinge (injection molded) 11 of the primary cover 10 in the vertical direction, and thereby the outer appearance is impaired.

Moreover, as shown in FIG. 3, vibration is generated during the wiping of the glass surface due to a narrow contact area between the hinge 11 of the primary cover 10 and the secondary lever 20, and thereby the operational performance of the wiper is deteriorated.

In FIG. 2, reference numeral 13 denotes a hinge reinforcing rib made of plastic to increase the strength of the hinge 11.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a wiper blade for a vehicle, which improves the assemblability and hinge strength between a primary cover and a secondary lever by further providing structures such as an adapter and a hinge member and provides a stable connection structure between the primary cover and the secondary lever by increasing the contact area between the primary cover and the adapter, thus improving the performance of the wiper blade.

In an aspect of the present invention, the wiper blade for a vehicle may include a secondary lever including a lever rivet hole, an adapter including a guide rib formed in the longitudinal direction thereof, a locking projection formed at the rear thereof, and an adapter rivet hole, a primary cover including a guide groove formed in the longitudinal direction thereof and into which the guide rib of the adapter is inserted, and a locking groove into which the locking projection of the adapter is inserted, and a hinge member penetrating the lever rivet hole and the adapter rivet hole and pivotally coupling the adapter and secondary lever.

The guide rib may be slidably inserted into the guide groove in the longitudinal direction of the primary cover.

The guide rib may be inclined downwardly from an side surface of the adapter with a predetermined angle and the guide groove is inclined with the predetermined angle to receive the guide rib therein and wherein the locking groove extends to the bottom of the primary cover and opens thereto such that the guide rib is forcibly inserted into the guide groove in the vertical direction, wherein the predetermined angle is an obtuse angle.

In another aspect of the present invention, the wiper blade may further include a spacer disposed between the secondary lever and adapter, wherein both side surfaces of the spacer are tapered with a predetermined angle and the hinge member penetrates the both side surfaces.

The hinge member may penetrate a narrow portion of the both side surfaces and a wide portion thereof may face toward the locking projections of the adapter.

In further another aspect of the present invention, a cover contact may protrude from an inner surface of the primary cover with a predetermined length and the guide groove is formed therein to come in contact with an outer surface of the adapter and to support the adapter.

According to various aspects of the wiper blade of the present invention, the primary cover and the secondary lever are slidably assembled and connected to each other by the use of the adapter, and the secondary lever and the adapter are hinge-connected by means of a rivet, thus improving the assemblability and hinge strength.

Moreover, the present invention provides a stable connection structure between the primary cover and the secondary lever by increasing the contact area between the primary cover and the adapter, thus preventing vibration during wiping of the glass surface and improving the performance of the wiper blade.

Further, the present invention improves the mass productivity of the wiper by the improvement of the assemblability. In addition, with the use of the adapter, it is possible to prevent a gap between the primary cover and the secondary lever, which may be caused during the operation of the wiper, by assembling the primary cover and the secondary lever in a slidable manner in the lateral direction, in a forcible manner in the vertical direction, or in a riveting manner, thus increasing the durability.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
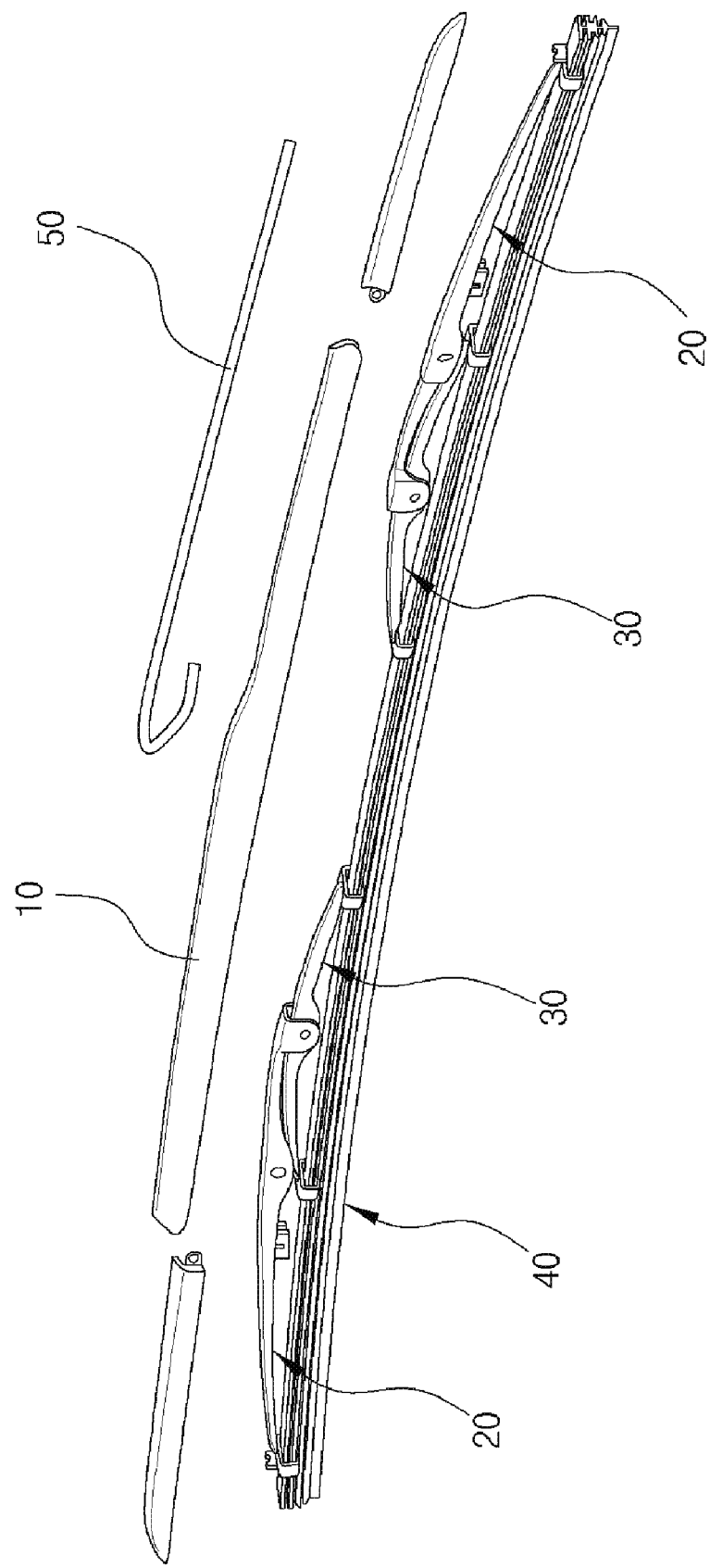
FIG. 1 is an exploded perspective view showing a conventional wiper blade for a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention provides an exemplary wiper blade for a vehicle which is used to remove water and other substances from the surface of a front or rear glass (i.e., a windshield glass or rear window). The exemplary wiper blade of the present invention improves the assemblability and hinge strength between a primary cover 100 and a secondary lever 200 and provides a stable connection structure between then, thus improving the operational performance of the wiper blade.

Figure 5:
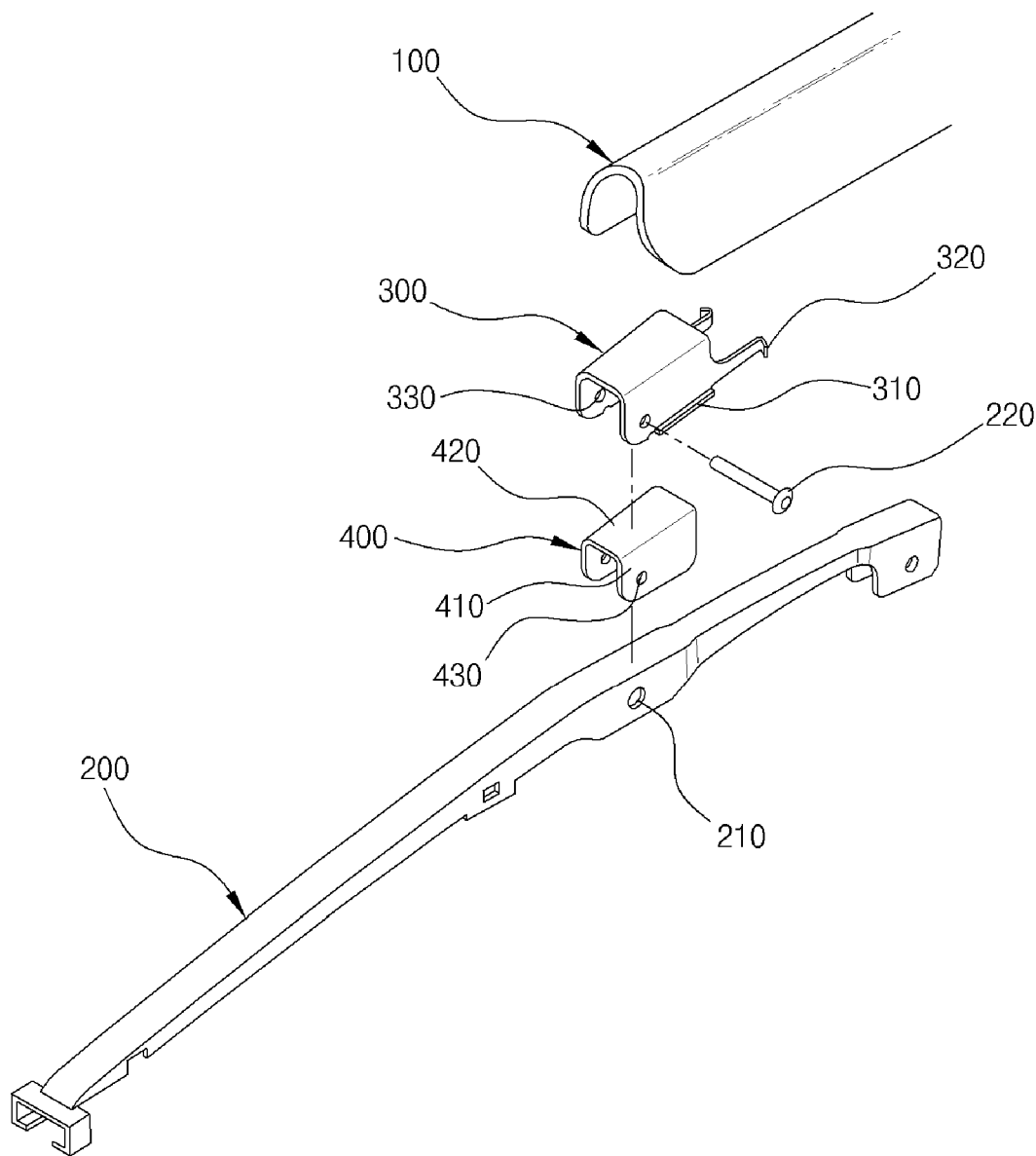
FIG. 5 is an exploded perspective view showing an exemplary wiper blade for a vehicle in accordance with the present invention.
Figure 6:
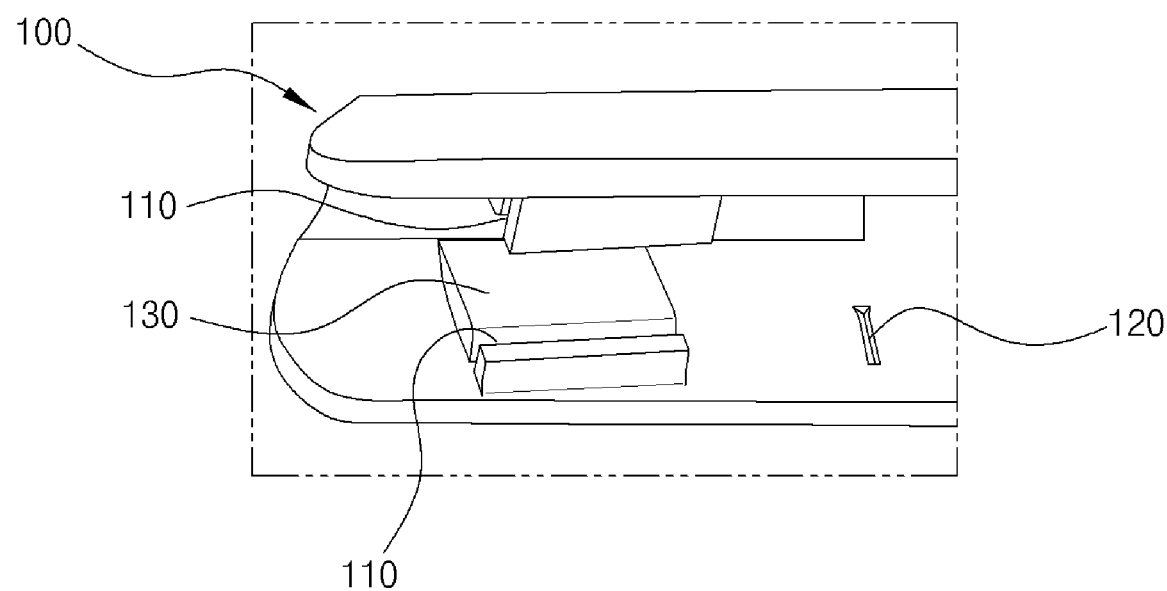
FIG. 6 is a partial perspective view showing an internal structure of a primary cover in accordance with an exemplary wiper blade of the present invention.
Figure 7:
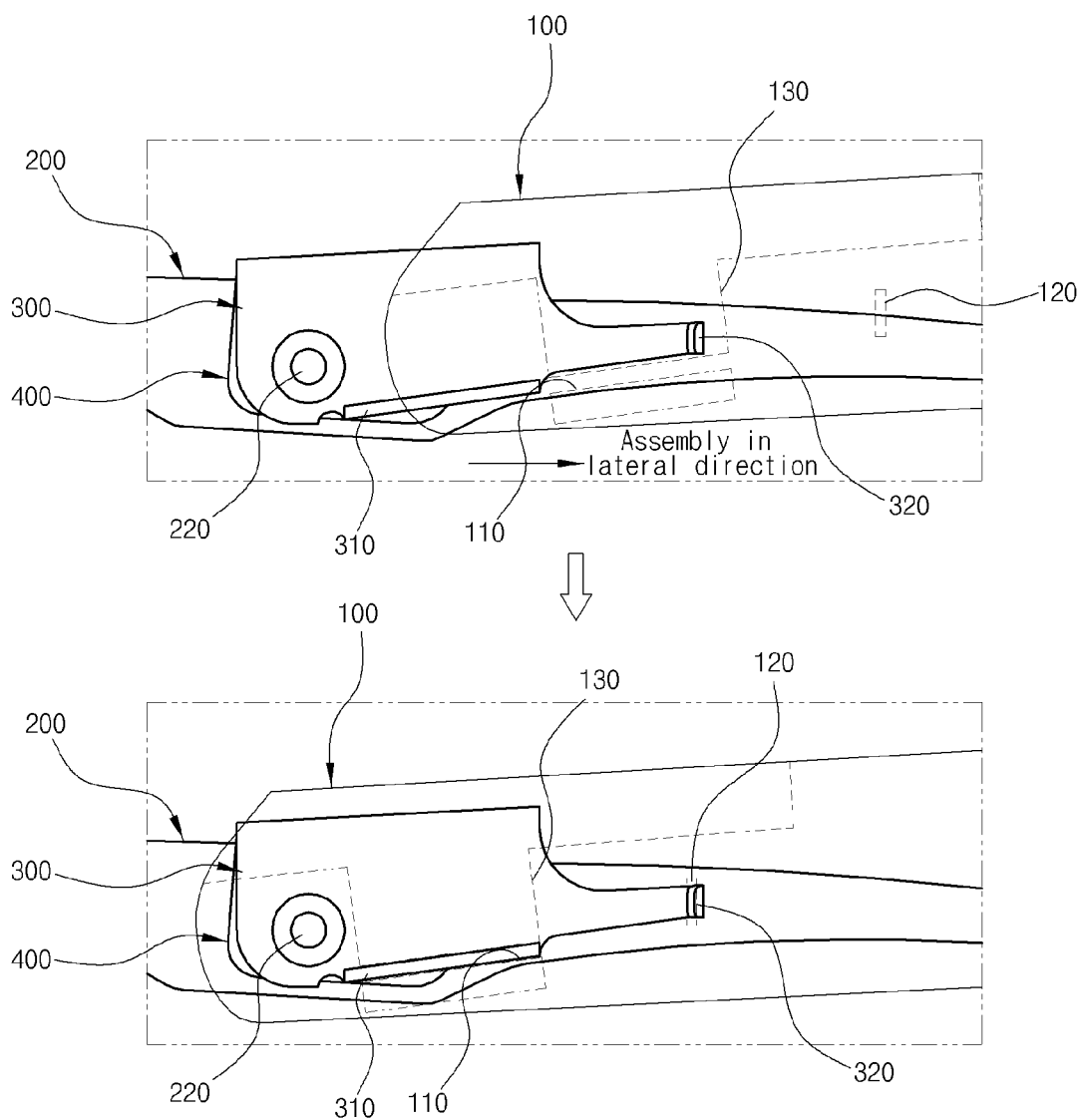
FIG. 7 is a side view showing a sliding connection of an exemplary wiper blade in accordance with the present invention.

FIG. 5 is an exploded perspective view showing a wiper blade for a vehicle in accordance with an exemplary embodiment of the present invention, FIG. 6 is a partial perspective view showing an internal structure of a primary cover in accordance with an exemplary embodiment of the present invention, and FIG. 7 is a side view showing a sliding connection of a wiper blade in accordance with an exemplary embodiment of the present invention.

Figure 8:
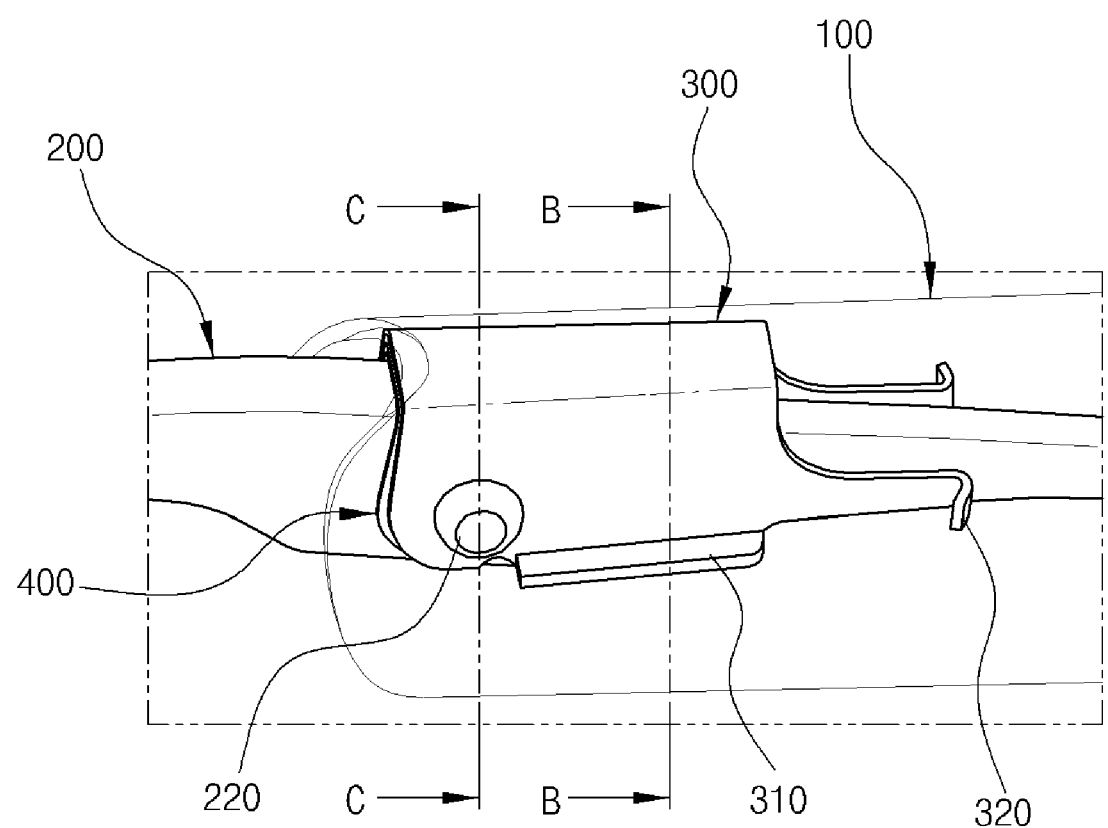
FIG. 8 is an assembled perspective view showing an exemplary wiper blade for a vehicle in accordance with the present invention.
Figure 9:
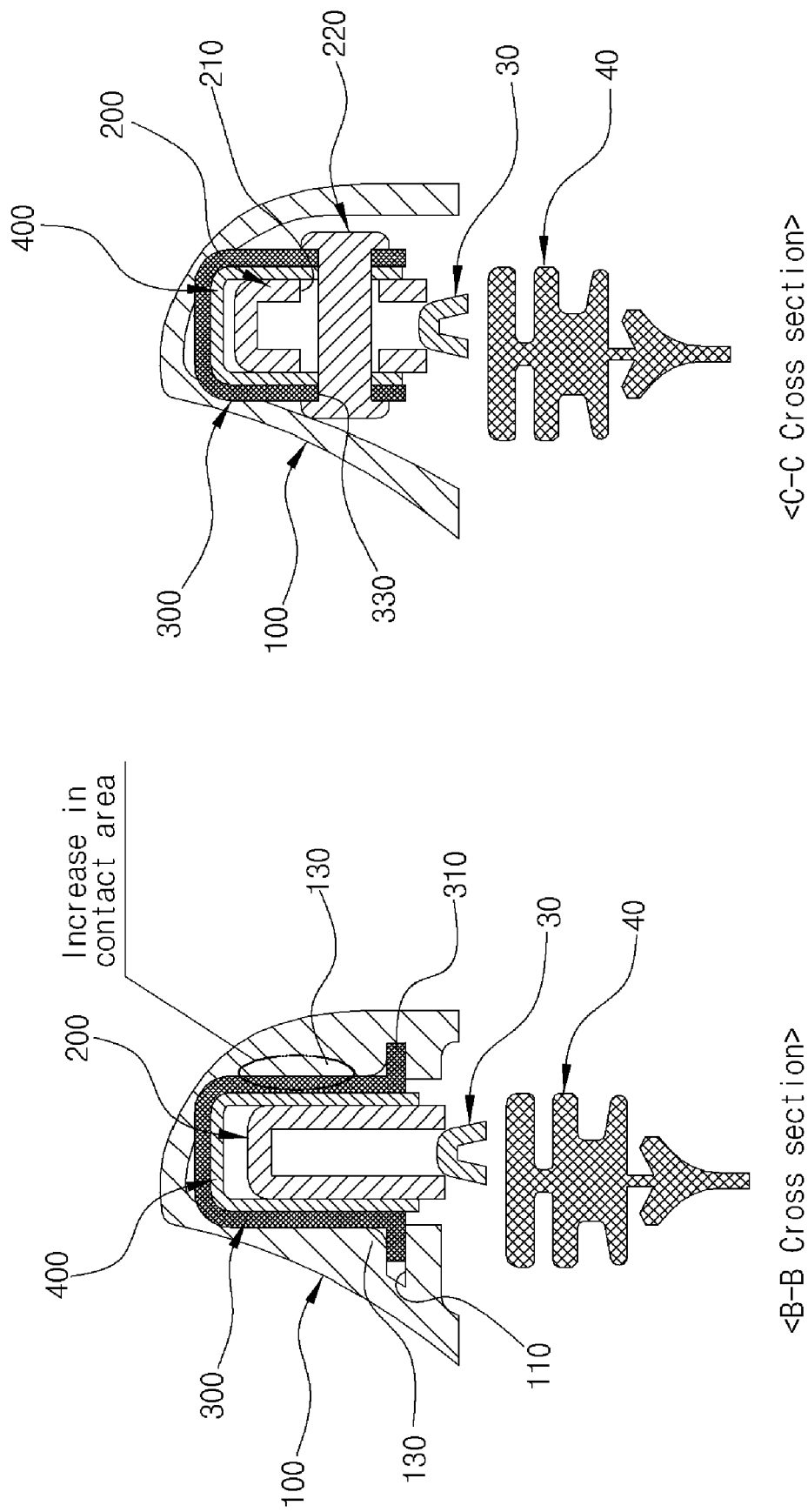
FIG. 9 cross-sectional views taken along lines B-B and C-C of FIG. 8.

FIG. 8 is an assembled perspective view showing a wiper blade for a vehicle in accordance with an exemplary embodiment of the present invention, and FIG. 9 cross-sectional views taken along lines B-B and C-C of FIGS. 8.

Figure 2:
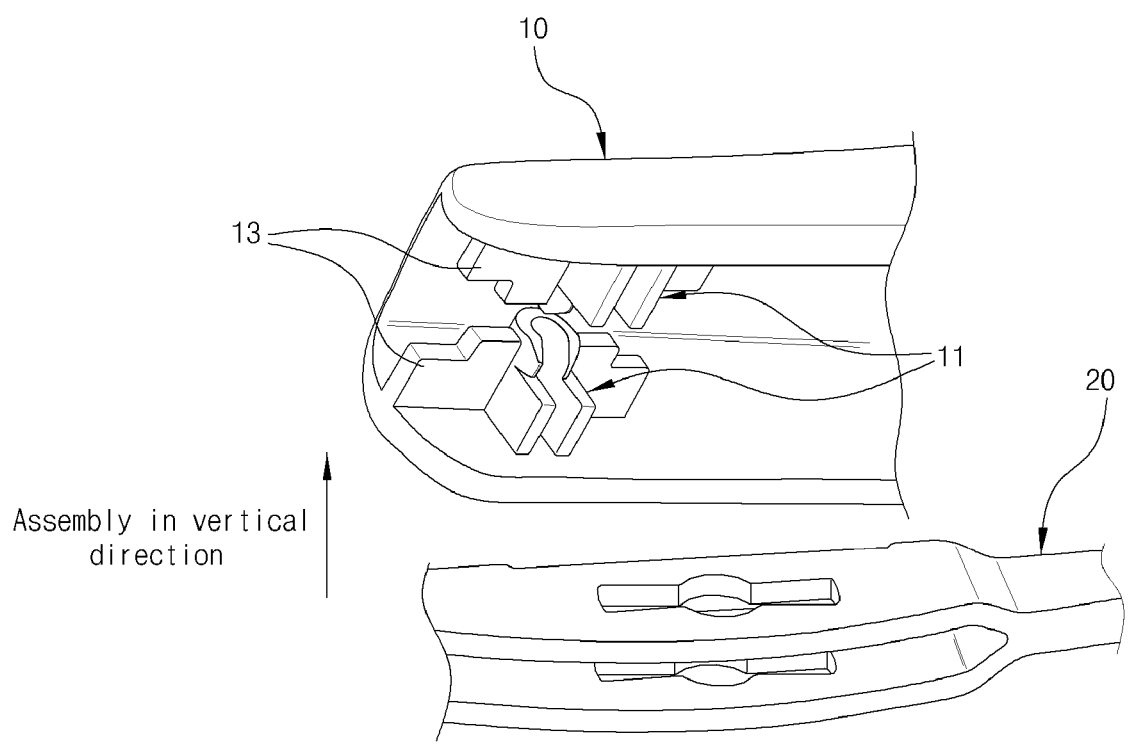
FIG. 2 is a partial perspective view showing a primary cover and a secondary lever of a conventional wiper blade.
Figure 3:
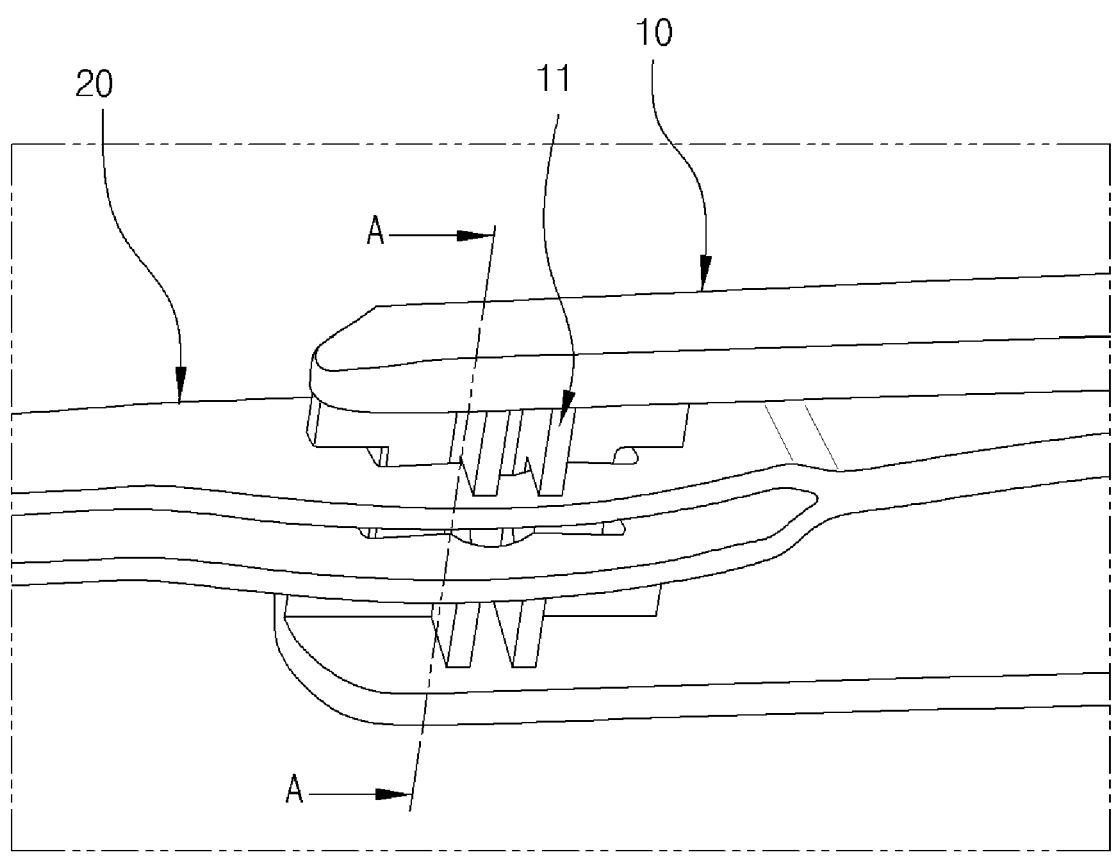
FIG. 3 is a partial perspective view showing a hinge structure of a conventional wiper blade.
Figure 4:
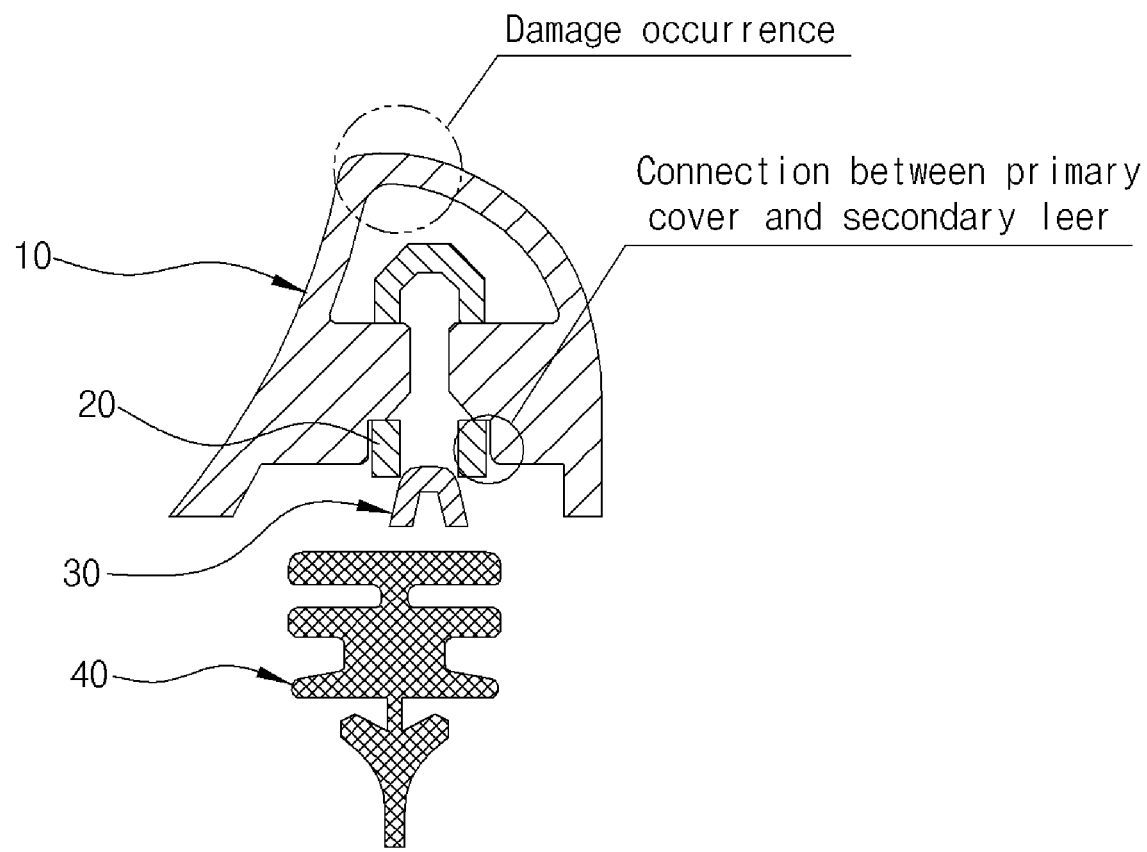
FIG. 4 is a cross-sectional view taken along line A-A of FIG. 3.

As shown in the figures, the present invention provides a wiper blade in which a high strength hinge member 220 (e.g., rivet) is employed instead of an existing plastic injection molded hinge (11 in FIGS. 2 and 3) to improve the assemblability and hinge strength between the primary cover 100 and the secondary lever 200, and an adapter 300 mountable between the primary cover 100 and the secondary lever 200 is further provided.

Therefore, the wiper blade according to the present invention may include the secondary lever 200 with a lever rivet hole 210, the adapter 300 mounted to surround one side of the secondary lever 200 (a part assembled with the primary cover 100), the primary cover 100 into which the adapter 300 is slidably inserted and locked, and a spacer 400 disposed between the secondary lever 200 and the adapter 300.

In the present invention, an adapter rivet hole 330 and a spacer rivet hole 430 are provided in the adapter 300 and the spacer 400, respectively, to be located on a straight line with the lever rivet hole 210 during assembly with the secondary lever 200. A hinge member 220 formed to penetrate the lever rivet hole 210, the adapter rivet hole 330, and the spacer rivet hole 430 at the same time is provided to improve the assemblability and hinge strength between the primary cover 100 and the secondary lever 200.

Meanwhile, a guide rib 310 formed on a lower end of the adapter 300 in the longitudinal direction thereof and a locking projection 320 formed at the rear of the guide rib 310 are provided in the adapter 300 to increase the connection strength between adapter 300 and the primary cover 100. Moreover, a guide groove 110 into which the guide rib 310 is slidably inserted and a locking groove 120 into which the locking projection 320 is inserted are provided in the primary cover 100.

With the above-described connection structure, the adapter 300 with which the secondary lever 200 is assembly is inserted into the inside of the primary cover 100 by the guide rib 310 sliding along the guide groove 110, and the locking projection 320 is inserted and fixed to the locking groove 120 in a final assembly position of the adapter 300, thus being fixedly assembled with the primary cover 100.

Moreover, in the wiper blade according to the present invention, both side surfaces 410 of the spacer 400 are tapered such that the height of an upper end surface 420 is gradually increased from one side to the other side and, as shown in FIG. 7, and the adapter 300 is inclinedly assembled on the secondary lever 200, thus facilitating the assembly with the primary cover 100.

The primary cover 100 according to an exemplary embodiment of the present invention includes a cover contact 130 which protrudes from an inner surface of the primary cover 100 with a predetermined thickness wherein the guide groove 110 is formed in the cover contact 130. When the primary cover 100 and the adapter 300 are assembled together, the cover contact 130 comes in contact with the outer surface of the adapter 300 to support the adapter 300.

Here, since the cover contact 130 and the outer surface of the adapter 300 have the same or similar shape, the contact area between them increases, and thus the primary cover 100 and the adapter 300 are stably connected to each other.

Therefore, according to the wiper blade of the present invention, it is possible to improve the assemblability and hinge strength and the performance of the wiper blade during wiping of the glass surface, thus improving the mass productivity. Moreover, it is possible to prevent a gap between the primary cover 100 and the secondary lever 200, and thus the durability is increased.

In FIG. 9, reference numerals 30 and 40 denote a yoke and a blade rubber, respectively.

In the present invention, the secondary cover 200 and the adapter 300 are made of steel, and the primary cover 100 is made of plastic.

An assembly process of the wiper blade having the above-described configuration in accordance with the present invention will be described below.

First, the spacer 400 is assembled on the secondary lever 200 such that the position of the lever rivet hole 210 and that of the spacer rivet hole 430 coincide with each other. Then, the adapter 300 is assembled on the spacer 400 such that the spacer rivet hole 430 and the adapter rivet hole 330 are aligned with each other. Subsequently, the hinge member 220 simultaneously penetrates the rivet holes 210, 330, and 430 of the above structures to be riveted and hinge-connected.

At this time, the secondary lever 200 and the adapter 300 assembled with the spacer 400 are slidably inserted into the guide groove 110 of the primary cover 100 such that the locking projection 320 of the adapter 300 is inserted into the locking groove 120 of the primary cover 100, and thereby the adapter 300 is fixed in a final assembly position, thus completing the assembly in accordance with the present invention.

Next, another exemplary embodiment of the present invention will be described, and a description of the same elements as those described above will be omitted herein for the sake of brevity.

Figure 10:
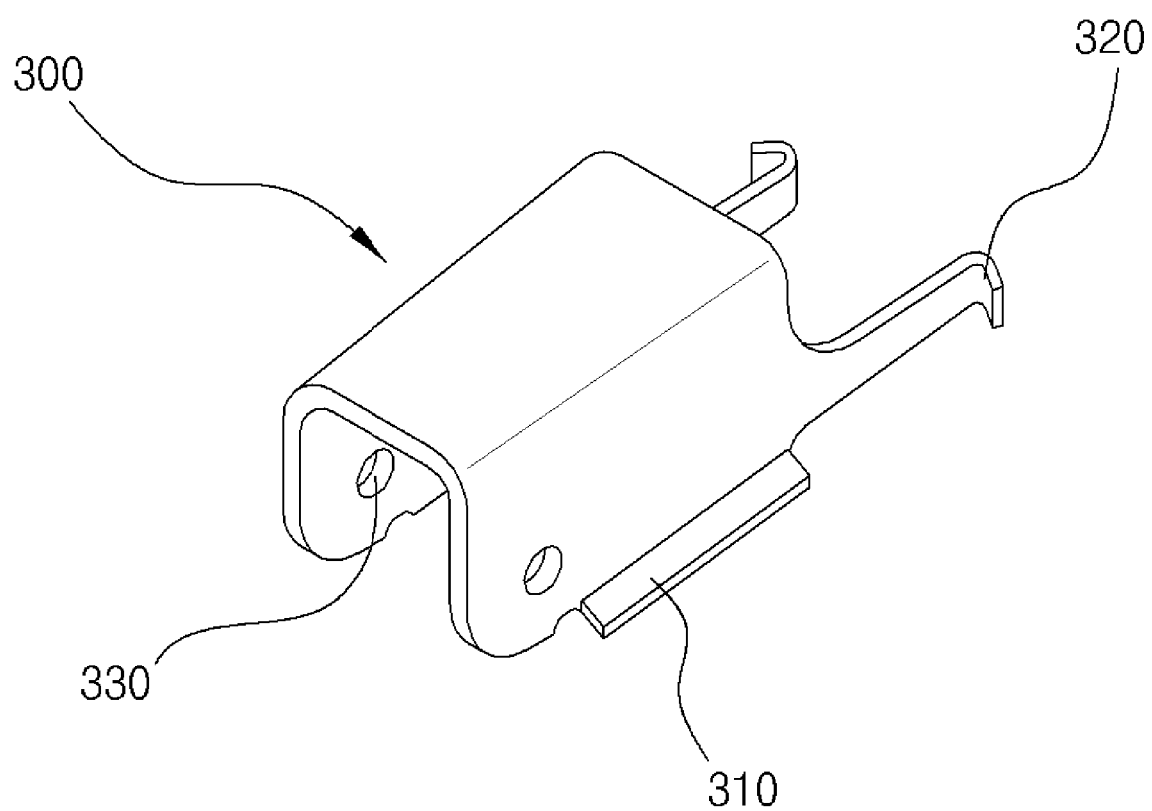
FIG. 10 is a perspective view showing an adapter in accordance with an exemplary wiper of the present invention.
Figure 11:
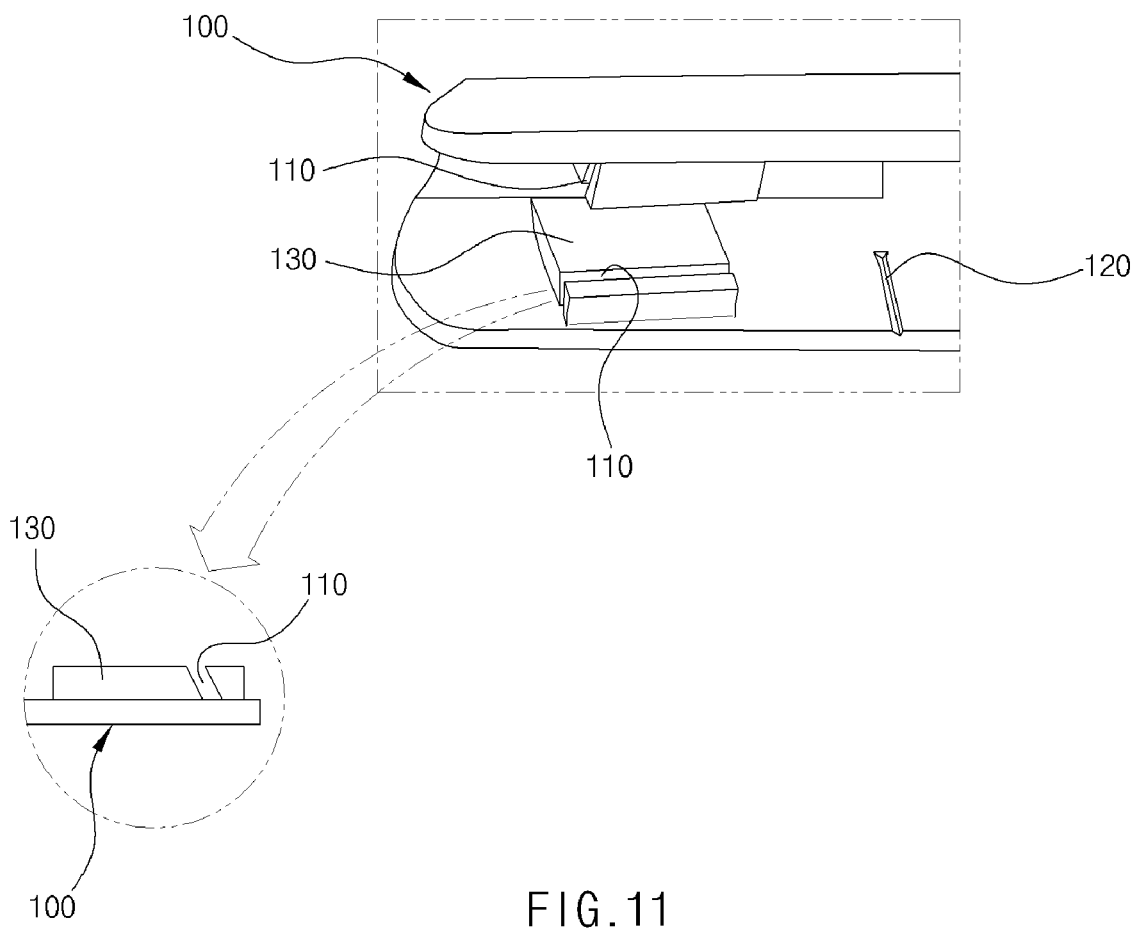
FIG. 11 is a partial perspective view showing an internal structure of a primary cover in accordance with an exemplary wiper blade of the present invention.
Figure 12:
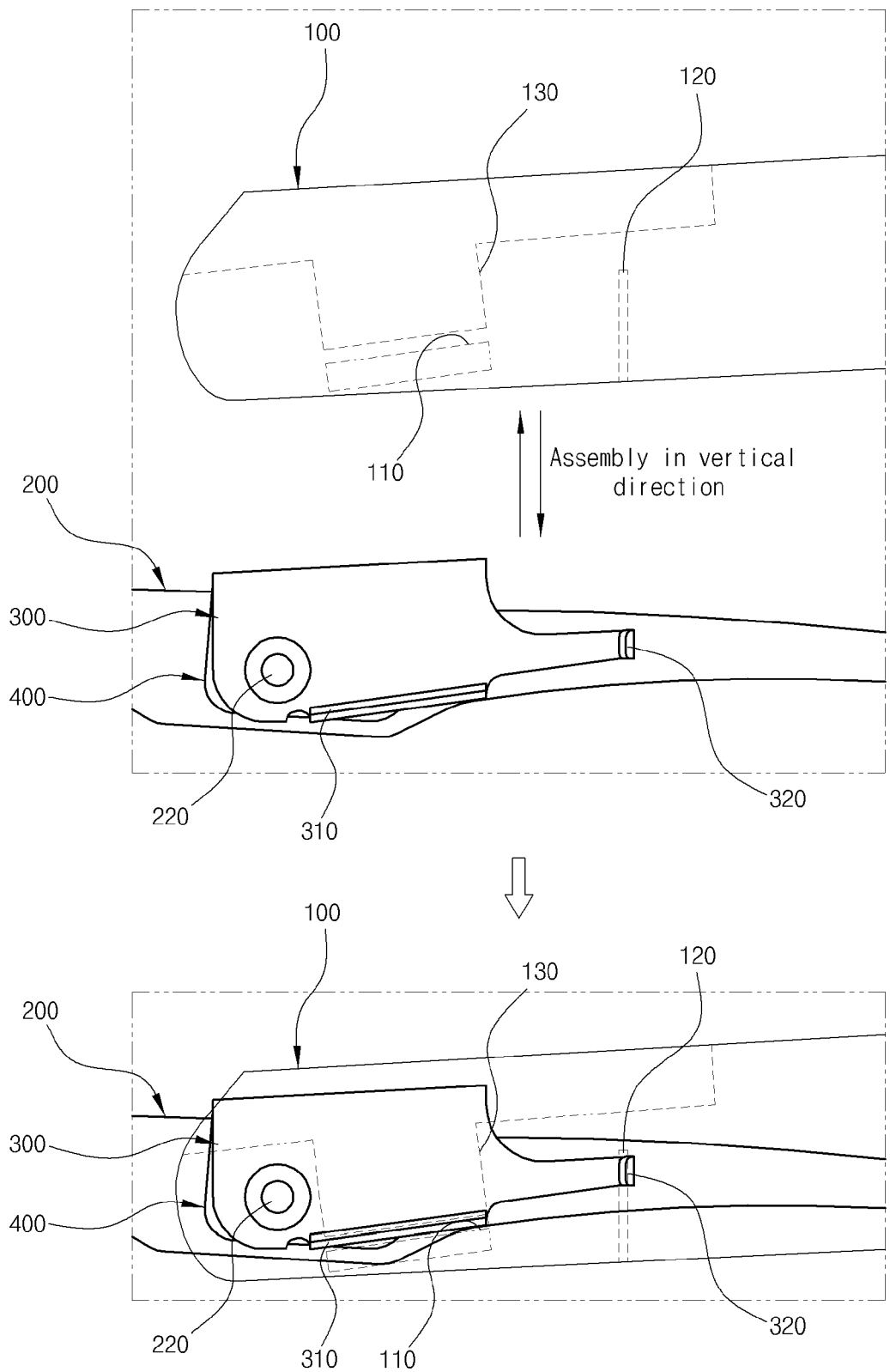
FIG. 12 is a side view showing a sliding connection of an exemplary wiper blade in accordance with the present invention.

FIG. 10 is a perspective view showing an adapter in accordance with another exemplary embodiment of the present invention, FIG. 11 is a partial perspective view showing an internal structure of a primary cover in accordance with another exemplary embodiment of the present invention, and FIG. 12 is a side view showing a sliding connection of a wiper blade in accordance with another exemplary embodiment of the present invention.

As shown in FIG. 10, the adapter 300 in accordance with another exemplary embodiment of the present invention includes a guide rib 310 which protrudes outwardly from the bottom of the adapter 300, the guide rib 310 being inclined downwardly. Therefore, the side surface of the adapter 300 and the guide rib 310 form an obtuse angle (greater than 90°).

Moreover, as shown in FIG. 11, a guide groove 110 of a primary cover 100 is also inclined downwardly for the assembly with the adapter 300 in the vertical direction, and a locking groove 120 into which a locking projection 320 of the adapter 300 inserted extends to the bottom.

As a result, as shown in FIG. 12, it is possible to insert the adapter 300 into the primary cover 100 from downward to upward or put the primary cover 100 on the adapter 300. At this time, the guide rib 310 of the adapter 300 is forcibly inserted into the guide groove 110 of the primary cover 100 by elasticity, and the locking projection 320 of the adapter 300 is inserted and assembled into the locking groove 120 opened at the bottom of the primary cover 100.

Therefore, the guide rib 310 of the adapter 300 increases the connection strength in the vertical direction, and the locking projection 320 increases the connection strength in the horizontal direction.

As the adapter 300 according to the present invention is forcibly inserted into the primary cover 100 in the vertical direction, the connection strength is further increased.

As described above, the present invention improves the assemblability and hinge strength using the high strength hinge member 220 and adapter 300 instead of the existing injection molded hinge (11 in FIGS. 2 and 3) and provides a stable connection structure between the primary cover 100 and the secondary lever 200 by increasing the contact area between the primary cover 100 and the adapter 300, thus preventing vibration during wiping of the glass surface and improving the performance of the wiper blade.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

For convenience in explanation and accurate definition in the appended claims, the terms "upper", "outer", "inner" and "bottom" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wiper blade for a vehicle, the wiper blade comprising:
a secondary lever including a lever rivet hole;
an adapter including a guide rib formed in the longitudinal direction thereof, a locking projection formed at the rear thereof, and an adapter rivet hole;
a primary cover including a guide groove formed in the longitudinal direction thereof and into which the guide rib of the adapter is inserted, and a locking groove into which the locking projection of the adapter is inserted; and
a hinge member penetrating the lever rivet hole and the adapter rivet hole and pivotally coupling the adapter and secondary lever.

2. The wiper blade of claim 1, wherein the guide rib is slidably inserted into the guide groove in the longitudinal direction of the primary cover.

3. The wiper blade of claim 1, wherein the guide rib is inclined downwardly from a side surface of the adapter with a predetermined angle and the guide groove is inclined with the predetermined angle to receive the guide rib therein and wherein the locking groove extends to the bottom of the primary cover and opens thereto such that the guide rib is forcibly inserted into the guide groove in the vertical direction.

4. The wiper blade of claim 1, wherein a predetermined angle between a side surface of the adapter and a top surface of the guide rib is an obtuse angle.

5. The wiper blade of claim 1, further comprising a spacer having a first side surface and a second side surface disposed between the secondary lever and adapter, wherein the first side surface and the second side surface of the spacer are tapered with a predetermined angle and the hinge member penetrates the first side surface and the second side surface.

6. The wiper blade of claim 5, wherein the hinge member penetrates a narrow portion of the first side surface and the second side surface and a wide portion thereof faces toward the locking projections of the adapter.

7. The wiper blade of claim 5, wherein the guide rib is slidably inserted into the guide groove in the longitudinal direction of the primary cover.

8. The wiper blade of claim 5, wherein the guide rib is inclined downwardly from a side surface of the adapter with a predetermined angle and the guide groove is inclined with the predetermined angle to receive the guide rib therein and wherein the locking groove extends to the bottom of the primary cover and opens thereto such that the guide rib is forcibly inserted into the guide groove in the vertical direction.

9. The wiper blade of claim 1, wherein a cover contact protrudes from an inner surface of the primary cover with a predetermined length and the guide groove is formed therein to come in contact with an outer surface of the adapter and to support the adapter.

10. The wiper blade of claim 9, wherein the guide rib is slidably inserted into the guide groove in the longitudinal direction of the primary cover.

11. The wiper blade of claim 9, wherein the guide rib is inclined downwardly from a side surface of the adapter with a predetermined angle and the guide groove is inclined with the predetermined angle to receive the guide rib therein and wherein the locking groove extends to the bottom of the primary cover and opens thereto such that the guide rib is forcibly inserted into the guide groove in the vertical direction.

12. The wiper blade of claim 11, wherein the predetermined angle between the side surface of the adapter and a top surface of the guide rib is an obtuse angle.

* * * * *